Figure 1:
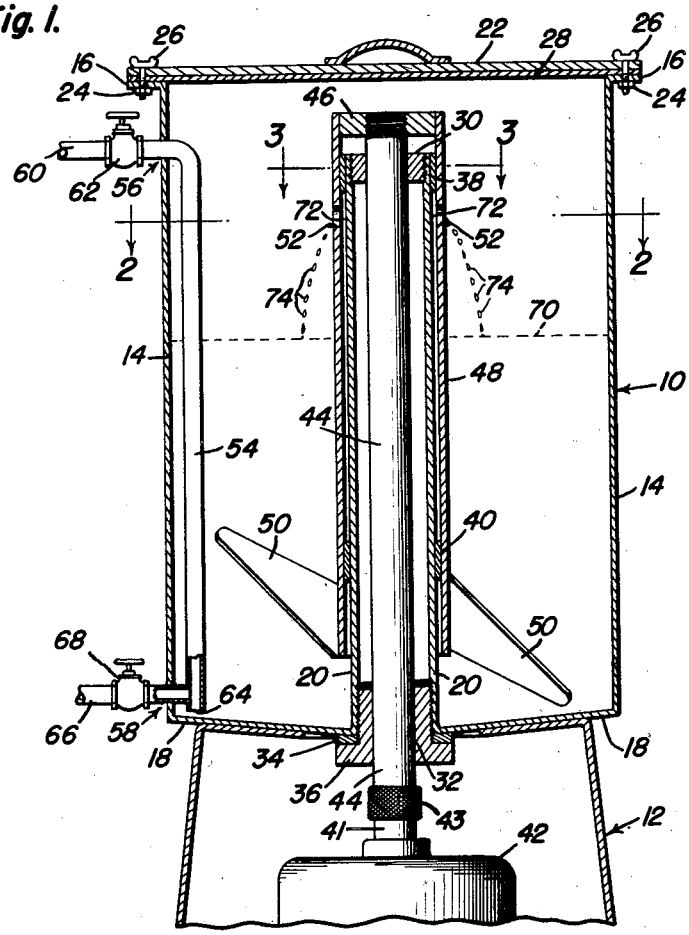

Dec. 18, 1956

M. A. FRANK, SR 2,774,576

BLENDER

Filed April 11, 1952

INVENTOR.
Milton A. Frank, Sr.

BY

ATTORNEY

2,774,576

BLENDER

Milton A. Frank, Sr., Frederick, Md.

Application April 11, 1952, Serial No. 281,879

13 Claims. (Cl. 259—8)

(Granted under Title 35, U. S. Code (1952), sec. 266)

The invention described herein may be manufactured and used by or for the Government for governmental purposes without the payment to me of any royalty thereon.

The invention relates generally to a blender of the type which has a central, blade carrying post which is movably mounted in a bearing in the bottom wall of the blender bowl, and specifically to the problems in a blender of this type of: (1) eliminating leakage through the bearing, (2) permitting sterilization of the blender by steam autoclaving without damaging any of the parts, and (3) eliminating escape of mist past the blender bowl lid when fluid is transferred into or out of the bowl.

Food and other blenders of this general type are commercially available and have been widely accepted by the public. While there is normally some leakage through the central post bearing in the bottom wall of the bowl, and perhaps some mist escapes past the top closure in these devices, it is not practically a serious matter, for the contents of the bowl are harmless to the operator. Cleaning of conventional blenders is also not practically a serious problem for no attempt is normally made to sterilize them by steam autoclaving, therefore the parts are not subject to damage in the cleaning process.

There are certain circumstances of use wherein the above-mentioned defects of conventional blenders would be so serious as to preclude the use of conventional blenders. For example, in biological laboratory procedures, such as those pertaining to the assay of microorganisms in viscera, a necessary step is the disintegration of sample material into a watery suspension. Conventional blenders customarily are used to effect the disintegration and while they accomplish the disintegration to a degree sufficient to liberate the microorganisms from the tissue, they are unsatisfactory when considered from the standpoint of safety to the operator. When charged with material containing pathogenic microorganisms they create a highly hazardous condition due to the leakage of fluid. It has been determined that leakage occurs around the bearing in the bottom wall of the bowl, and that an aerosol of microorganisms is produced and escapes past the bowl lid when infectious fluid is transferred into or out of the bowl. Lastly, it was found that steam autoclaving of the blender bowl damages the bearing packings.

It is a primary object of this invention to provide a blender wherein: (1) leakage of fluid around the central post bearing is eliminated to the point that an aseptic environment around the blender will be maintained, (2) the apparatus may be sterilized by steam autoclaving without damaging any of the parts, and (3) transfer of fluid into and out of the blender bowl may be accomplished without emitting an aerosol of microorganisms.

Figure 2:
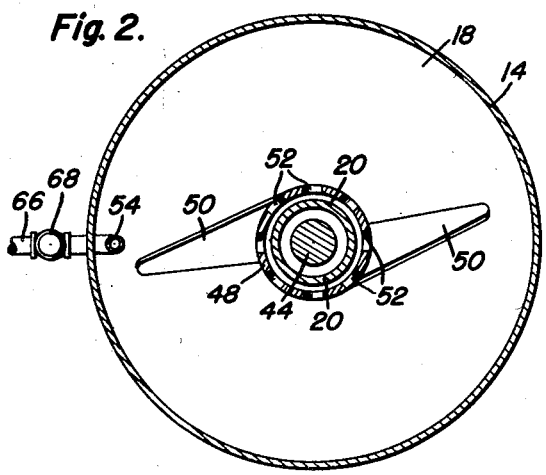
Figure 3:
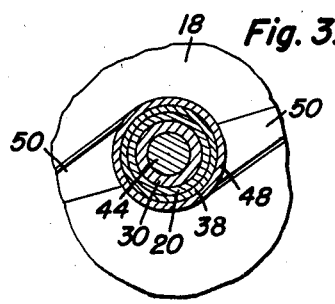

The above and other objects will become apparent from the following detailed description. The invention is illustrated by way of example in the accompanying drawings, wherein like reference characters refer to like parts throughout the views, and wherein:

Fig. 1 is a sectional view taken in a plane that extends vertically through the device, Fig. 2 is a sectional view taken on line 2—2 of Fig. 1, and Fig. 3 is a sectional view taken on line 3—3 of Fig. 1.

Referring to the drawings, the blender generally comprises the bowl 10 and the base 12, which are removably secured together in any conventional manner. Bowl 10 comprises upstanding, cylindrical side wall 14 having a flange 16 formed at its upper end, and bottom wall 18 having upwardly extending cylindrical sleeve 20 formed thereon. Removable bowl lid 22 is secured to flange 16 with sealing gasket 28 compressed therebetween by nuts 24 and bolts 26. Sleeve 20 extends upwardly into the interior of the bowl 10 to a point short of lid 22, and supports a bushing 30 within its upper end. Bushing 30 may be threadedly secured to sleeve 20, as illustrated, or secured in an equivalent manner. Within its lower end, sleeve 20 supports a bushing 32, with gasket 34 compressed between flange 36 of the bushing 32 and the underside of the bottom wall 18. Bushing 32 may be threadedly secured to sleeve 20 or secured in an equivalent manner. At its upper end, sleeve 20 supports a bushing 38 on its outer side, and at a point approximately one-third its length from the bottom wall of the bowl, sleeve 20 supports another bushing 40 on its outer side. Bushings 38 and 40 may be secured to sleeve 20 in any well-known manner.

Within the base 12 is housed a conventional source of power 42 which includes a conventional driving shaft 41 which drives shaft 44 through a conventional, detachable coupling 43. Shaft 44 is positioned within sleeve 20, being slidably supported by bushings 30 and 32, and extends upwardly into the bowl 10 to a point beyond the termination of sleeve 20. At its upper end, shaft 44 is connected to a collar 46 which in turn supports downwardly extending cylindrical sleeve 48. Sleeve 48 extends concentrically around sleeve 20 and is slidably supported by bushings 38 and 40. Sleeve 48 extends downwardly to a point short of the bottom wall 18 of the bowl, and carries cutting blades 50 at its lower end. Blades 50 are designed and positioned according to well-known principles to accomplish maceration and blending of any coarse solid matter that is suspended in the fluid which is introduced into the bowl. Sleeve 48 has a series of openings 52 formed around its periphery in a horizontal plane which passes through a point which is near its upper end, but lower than the upper end of sleeve 20 when the parts are in assembled position. Openings 52 constitute ports which connect the interior of bowl 10 with the space between sleeves 20 and 48 for a purpose which will subsequently be described.

Transfer of fluid into or out of the bowl 10 is accomplished aseptically by eduction tube 54 which includes upper and lower horizontal legs 60 and 66 respectively which project through the bowl wall 14 at points 56 and 58 respectively, and which are secured thereto by welding or its equivalent. Upper horizontal leg 60 of the eduction tube 54 has a control valve 62 mounted therein which is accessible from the outside of bowl 10. At its lowest point, eduction tube 54 has an opening 64 which places the interior of the tube 54 into communication with the interior of the bowl 10 near the bottom wall 18. Lower horizontal leg 66 of tube 54 has a control valve 68 mounted therein which is accessible from the exterior of bowl 10.

The blender structure as described operates in the following manner to completely eliminate leakage between the bowl 10 and lid 22: lid 22 with its gasket 28 forms a leak-proof seal with flange 16 of bowl 10. Fluid may be transferred into or out of the bowl 10 without removing lid 22, thereby avoiding any opportunity for a mist to escape during the transfer. To add fluid, control valve 68 is closed and control valve 62 is opened. Fluid flows from a source (not shown) through upper leg 60, past valve 62, down the vertical portion of eduction tube 54, and out opening 64 into the bowl 10. When the desired amount of fluid has been introduced into the bowl 10, valve 62 is closed. To withdraw fluid from the bowl, valve 62 is closed and valve 68 is open. Fluid 70 flows from bowl 10 into opening 64, through lower leg 66, past valve 68 to a point of disposition (not shown).

Leakage around the bearing for the shaft 44 is also prevented by my novel arrangement. Fluid 70 may be introduced into bowl 10 up to any desired level less than approximately two-thirds of the distance from the bottom wall 18 to the top of sleeve 48. Under no circumstances should the level of the fluid closely approach the level of the openings 52. Upon actuation of the source of power 42, the following parts move as a unit; driving shaft 41, coupling 43, shaft 44, collar 46, sleeve 48, and cutting blades 50. Whether the movement is rotation or oscillation is not pertinent to the invention. Fluid 70 rises in the space between sleeves 20 and 48 by capillary attraction, and possibly by the action of other forces. Some fluid will seep past bushing 40, and upon rising to a point above the level of openings 52, indicated generally by line 72, will overflow through said openings back into the main body of fluid 70 (as is shown schematically by droplets 74). With this arrangement, fluid 70 is prevented from rising above the level of openings 52 and reaching the area around the upper extremity of sleeve 20, which is the first point where leakage could possibly occur along shaft 44.

It should be noted that this arrangement for preventing leakage around the bearing for shaft 44 is a salient feature of my invention. I am aware that central post, sealing arrangements are known, however, to my knowledge, none of them include overflow ports such as my openings 52. The overflow ports are critical because they constitute the crux of my sealing arrangement, and because without them my invention would not accomplish its objects.

Another outstanding feature of my invention is that my blender can be sterilized by steam autoclaving because it does not include conventional bearing packings which would become damaged by steam autoclaving. To sterilize the blender, shaft 44 is uncoupled from driving shaft 41, and the blender bowl 10 and its associated structure is removed from base 12 and put into an autoclave.

While bearings 30, 32, 38 and 40 have been shown as sleeve bearings, it should be noted that other types of bearings can be used.

Having fully described one particular form of my invention, it should be understood that I do not intend thereby to limit myself to the precise construction shown, but intend to include all modifications that fall within the spirit and scope of the invention as defined in the following claims.

I claim:

1. A blender comprising the combination of a closed container, an opening in the bottom wall of said container, a sleeve secured in said opening and extending upwardly within said container to a point below the top thereof, a shaft connected to a rotating source of power on the exterior of said container and extending through said sleeve to a point above said sleeve, a downwardly extending blade carrying sleeve surrounding and spaced from said first-mentioned sleeve and attached to said shaft at the upper end thereof, bearing means for said blade carrying sleeve said bearing means including a bearing near the top of said blade carrying sleeve, openings in said blade carrying sleeve positioned at a point near its upper end, below the bearing and above the liquid level in said container.

2. A blender as defined in claim 1 wherein said bearing means includes one baring near the bottom and one bearing near the top of said blade carrying sleeve and wherein said openings in said blade carrying sleeve are positioned between said bearings.

3. A blender as defined in claim 1 which includes a pair of bearings supported within and by said first-mentioned sleeve, said bearings having bearing contact with said shaft, one of said bearings being positioned near the lower end of said first-mentioned sleeve and the other of said bearings being positioned near its upper end.

4. In a blender, the combination of a closed container, an upwardly extending first sleeve supported in an opening in the bottom wall of said container and terminating at a point below the top of said container, a shaft connected to an external source of power, extending into said container through said first sleeve to a point beyond the upper extremity of said sleeve, a downwardly extending second blade carrying sleeeve surrounding and spaced from said first sleeve and attached to the upper extremity of said shaft, upper and lower bearing means positioned between said first sleeve and second blade carrying sleeve, the upper of said bearing means being positioned near the top and the lower bearing means near the bottom of said second blade carrying sleeve, openings in said second sleeve positioned between said upper and lower bearing means and near said upper bearing means.

5. A blender as defined in claim 4, said shaft being journaled in bearings which are positioned near the top and bottom of said first-mentioned sleeve.

6. A blender as defined in claim 4 in combination with a tube which extends from a source of fluid through and into said container at a point near the top thereof down to a point near the bottom thereof and a second tube extending through the wall of said container near the bottom thereof, each of said tubes having control valves external of said container.

7. A blender structure as defined in claim 6 wherein said first-mentioned tube and said second tube have a common opening into the container.

8. A blender comprising the combination of a container having an opening in the bottom wall thereof, an inner vertical sleeve tightly secured in said opening and extending upwardly within said container, a rotatable shaft connected to a rotating source of power on the exterior of said container and extending up through said sleeve to a point above said sleeve, a second blade carrying outer sleeve surrounding and spaced from said first mentioned sleeve and attached to said shaft at the upper end thereof, bearing means for positioning said rotatable shaft and attached blade carrying sleeve concentrically with said first mentioned inner sleeve, ports in said outer sleeve positioned near the top thereof and above a liquid level in said container for passing liquid from between said sleeves to said container above the liquid level therein.

9. A blender in accordance with claim 8 wherein the bearing means is positioned between the rotating shaft and said inner sleeve.

10. A blender in accordance with claim 8 wherein the bearing means includes a first bearing positioned between the rotatable shaft and said inner sleeve near the top thereof and a second bearing positioned between said inner and outer sleeves.

11. A blender in accordance with claim 8 wherein the bearing means includes a first bearing positioned between the rotatable shaft and inner sleeve near the top thereof, a second bearing positioned between said inner and outer sleeves near the top thereof, and a third bearing positioned between said inner and outer sleeve near the bottom thereof.

12. A blender in accordance with claim 1, in combination with two tubes through the side wall of said vessel, one of said tubes being positioned near the top of said vessel, the second tube being positioned near the bottom of said vessel, each of said tubes having control valves external of said vessel.

13. A blender in accordance with claim 8 wherein the bearing means includes a first bearing positioned between the rotatable shaft and said inner sleeve near the top thereof and a second bearing positioned between said inner and outer sleeves near the bottom thereof.

References Cited in the file of this patent

UNITED STATES PATENTS

| | | |
|---|---|---|
| 1,741,173 | Walker | Dec. 31, 1929 |
| 1,741,317 | Kirby | Dec. 31, 1929 |
| 1,743,200 | Felder | Jan. 14, 1930 |
| 1,758,354 | Coffield | May 13, 1930 |
| 1,891,339 | Waterworth | Dec. 20, 1932 |
| 2,109,501 | Osius | Mar. 1, 1938 |
| 2,485,689 | Baumann | Oct. 25, 1949 |